Nov. 13, 1934.  F. MEYER  1,980,492
DIAPHRAGM RESTRICTING THE IMAGE FIELD IN APPARATUS
FOR PROJECTION WITH TRANSMITTED LIGHT
Filed Jan. 5, 1933
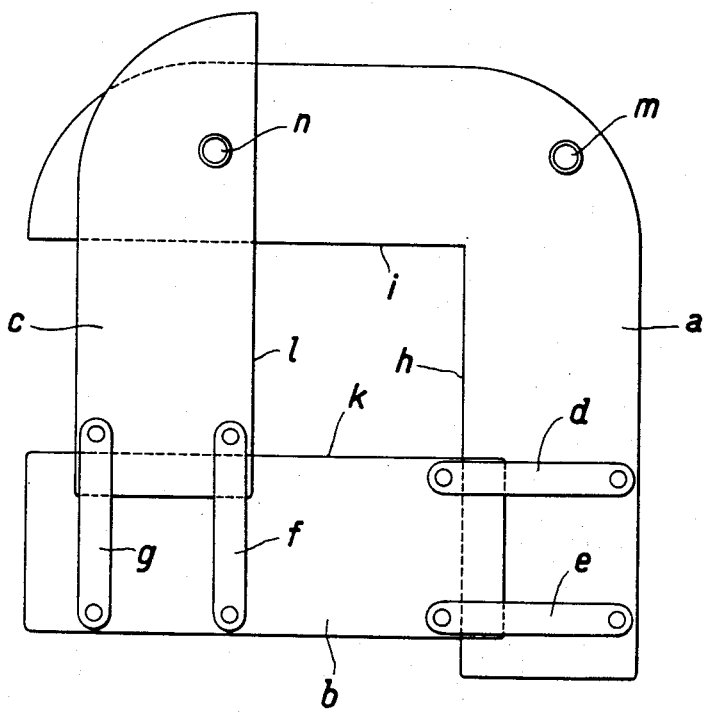
Inventor:
Franz Meyer Patented Nov. 13, 1934

1,980,492

UNITED STATES PATENT OFFICE 1,980,492

DIAPHRAGM RESTRICTING THE IMAGE FIELD IN APPARATUS FOR PROJECTION WITH TRANSMITTED LIGHT

Franz Meyer, Jena, Germany, assignor to firm Carl Zeiss, Jena, Germany

Application January 5, 1933, Serial No. 650,311
In Germany January 14, 1932

2 Claims. (Cl. 88—24)

I have filed an application in Germany, January 14, 1932, of which the following is a specification:

In projection apparatus, the image field is restricted generally by means of diaphragms disposed in the path of the projection rays. In apparatus for projection with transmitted light it is frequently the practice, for instance, to cover the object to be projected with a diaphragm which is completely opaque and whose aperture corresponds to the desired image field. In the case of comparatively great objects only part of which is left uncovered by the diaphragm, and when different parts of the object are to be projected successively, the projecting person will very often have to subject the object to a wearisome inspection in order to find the required part and place it into the diaphragm aperture, and this because the said person may not see anything else of the object but what lies in the aperture of the diaphragm.

This inconvenience may be overcome by applying a diaphragm which, according to the invention, is of a material that, although dark, is translucent. This quality of the diaphragm permits the projecting person looking through this diaphragm and on the light source to see all of the object, that is to say to perceive with sufficient distinctness also the parts covered by the diaphragm. Thus the diaphragm and the object may be rapidly displaced relatively to each other, so that the projection of the desired part may take place without any undue delay. The said material being dark, the light traversing it is not sufficient to allow an image of the covered part of the object to be projected, the surrounding of the diaphragm aperture being therefore dark on the screen.

Frequently, it is desired to vary the form and dimensions of the image field. When a changeable quadrangular image field is required, it is convenient to compose the diaphragm of an angular piece and two parts at least one side of which is rectilinear. The one of these two parts is to be displaceable relatively to one of the feet of the angular piece, and the other relatively to the first said part, in such a manner that these two parts remain parallel to the two feet of the angular piece. This construction enables the diaphragm aperture being given any size within the limits provided by the component parts of the diaphragm and to abide by the quadrangular form. If, as will generally be desired, the said angles are right angles, any rectangle or square within the said limits may be used as a diaphragm aperture.

The accompanying drawing, which illustrates the invention, represents in a top view a constructional example of the novel diaphragm.

The example consists of an angular piece $a$ and two movable parts $b$ and $c$. By means of four levers $d$, $e$ and $f$, $g$, serving as parallel guides, the parts $b$ and $c$, respectively, are rotatably attached to the feet of the angular piece $a$. The inner edges $h$, $i$ of the angular piece $a$ and the inner edges $k$, $l$ of the parts $b$, $c$ are rectilinear and delimit a rectangular image field. The parts $a$, $b$, $c$ of the diaphragm are of a paper substance impregnated with artificial resin (Pertinax) which is transparent when in comparatively thin layers as are usual with diaphragms. The angular piece $a$ and the part $c$ have knobs $m$ and $n$, respectively, which represent handles.

When in use, the diaphragm is placed on the trans-illuminated object to be projected, and by reciprocally displacing the knobs $m$ and $n$ it is so adjusted that the interior edges $h$, $i$, $k$, $l$ of its component parts $a$, $b$, $c$ rectangularly delimit the desired section of the object. The transparency of the parts $a$, $b$ and $c$ is sufficient to permit the projecting person looking through the diaphragm and on the light source to see also that portion of the object which is covered by the diaphragm.

I claim:

1. A diaphragm restricting the image field in apparatus for projection with transmitted light, this diaphragm consisting of an angular piece of a dark translucent material and two other parts at least one edge of which is rectilinear, also these two other parts being of a dark translucent material, a parallel guide disposed between the angular piece and one of the said rectilinear parts, and another parallel guide disposed between the two rectilinear parts.

2. A diaphragm restricting the image field in apparatus for projection with transmitted light, this diaphragm consisting of an angular piece of a dark translucent material and two other parts at least one edge of which is rectilinear, also these two other parts being of a dark translucent material, two guides of equal length and parallel to each other disposed between the angular piece and one of the said rectlinear parts, and two other guides of equal length and parallel to each other disposed between the two rectilinear parts.

FRANZ MEYER.